United States Patent [19]

Prabhu

[11] Patent Number: 5,561,178
[45] Date of Patent: Oct. 1, 1996

[54] ADDITION POLYMER COMPOSITION CONTAINING ISOXAZOLIDINE COMPOUNDS

[75] Inventor: Vaikunth S. Prabhu, Vienna, W. Va.

[73] Assignee: General Electric Company, Pittsfield, Mass.

[21] Appl. No.: 539,566

[22] Filed: Oct. 5, 1995

[51] Int. Cl.$^6$ ................................................ C08K 5/353
[52] U.S. Cl. ........................................................ 524/95
[58] Field of Search ............................................... 524/95

[56] References Cited

U.S. PATENT DOCUMENTS

| | | | |
|---|---|---|---|
| 3,960,816 | 6/1976 | Jurisch | 524/95 |
| 4,256,620 | 3/1981 | Aigner et al. | 524/95 |
| 4,288,176 | 9/1981 | Zestermann et al. | 524/95 |
| 4,590,231 | 5/1986 | Seltzer et al. | |
| 5,028,640 | 7/1991 | Shimaoka et al. | 524/95 |
| 5,037,867 | 8/1991 | Ravichandran et al. | 524/95 |
| 5,268,114 | 12/1993 | Odorisio et al. | |

FOREIGN PATENT DOCUMENTS 55-167277  12/1980  Japan.

OTHER PUBLICATIONS

Amine Oxides, vol. 2, pp. 259–271, Richard J. Nadolsky, Kirk–Othemer Encyclopedia of Chemical Technology vol. 2, Third Addition, 1978.

Organic Syntheses, Collective Vol. 5, John Wiley and Sons, pp. 1124–1127, 1973.

Mechanisms of Antioxidant Action: The Antioxidant Activity of Nitrones in Polypropylene, Journal of Polymer Science, vol. 30, pp. 3267–3281 (1986), Khirud B. Chakraborty, Gerald Scott and Hassan Yaghmour.

*Primary Examiner*—Veronica P. Hoke

[57] ABSTRACT

A resin composition is provided containing a resin (preferably a thermoplastic resin) and an isoxazolidine. The composition exhibits enhanced melt stability and color stability. The composition is useful for making thermoplastic articles such as extruded sheet and film. Preferably the thermoplastic resin is a polyolefin such as polypropylene. A method for stabilizing thermoplastic polymers is also provided.

16 Claims, No Drawings

ADDITION POLYMER COMPOSITION CONTAINING ISOXAZOLIDINE COMPOUNDS

BACKGROUND OF THE INVENTION

1. Field of the Invention

The present invention relates to thermoplastic polymer compositions, and more particularly relates to stabilized thermoplastic polymer compositions.

2. Description of the Related Art

Thermoplastic polymers such as polyolefins, for example, polypropylene and polyethylene, are generally well known. Such polymers can undergo instability in melt flow and undesirable colour changes during processing. Various types of additives such as phosphites, hindered phenols, hindered amine light stabilizers and nitrones have been added to polyolefins such as polypropylene. For example, CHAKRABORTY et al., Journal of Applied Polymer Science, Vol. 30, 3267–3281 (1985) entitled Mechanisms of Antioxidant Action: The Antioxidant Activity of Nitrones in Polypropylene, discloses the utilization of aldonitrones as melt stabilizers for polypropylene; and see CHAKRABORTY et al. Journal of Polymer Science: Polymer. Letters Edition, Vol. 22, 553–558 (1984) entitled Mechanisms of Antioxidant Action: Stabilization of Polymers by Spin Traps which discloses c-nitrose compounds as additives for polyolefins.

Consequently, there is a general need to improve the processing stability and colour of addition polymers such as polyolefins.

SUMMARY OF THE INVENTION

The present invention involves thermoplastic compositions comprising an isoxazolidine. The compositions exhibit improved processing stability and colour. Preferably the polymer is a polyolefin, and preferably the isoxazolidine is a triphenyl isoxazolidine or tetraphenylisoxazolidine. The compositions are useful for making molded and extruded articles such as thermoplastic film and sheet.

DETAILED DESCRIPTION OF THE INVENTION

The present invention involves thermoplastic polymer compositions comprising a thermoplastic resin and an isoxazolidine. The isoxazolidine improves the melt viscosity and colour stability of the resin.

The polymer may be any thermoplastic known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinyl chloride/ABS or other impact modified polymers, such as methacrylonitrile and alphamethylstyrene containing ABS, and polyester/ABS or polycarbonate/ABS and polyester plus some other impact modifier may also be used. Such polymers are available commercially or may be made by means well known in the art. However, the isoxazolidines of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene propylene-copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/-propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo-and copolymers, polyvinyl chloride, polyvinyl bromide, polyvinyl fluoride, polyvinylidene chloride, chlorinated polyethylene, chlorinated polypropylene, florinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene ether and sulfides, and mixtures of polyphenylene ethers with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-2(2,2,4(4-hydroxyphenyl)-propane) terephthalate and polyhydroxybenzoates as well as block-copolyetheresters derived from polyethers having hydroxyl end groups.

Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylene diamine and isophthalic or/and terephthalic acid and optionally an elastomer as modifier, for example poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

The isoxazolidines may also be used in polymeric resin compositions such as thermoset resins, such as thermoset polyesters, thermoset epoxies, thermoset alkyds, thermoset melamines, thermoset ureaformaldehydes as thermoset phenolics. The isoxazolidines may also be used in rubbers such as diene and alkacrylate rubbers.

The isoxazolidines are preferably represented by the general formula

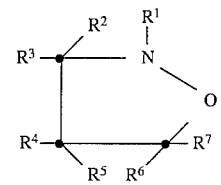

wherein each $R^1$, $R^2$, $R^3$, $R^4$, $R^5$, $R^6$ and $R^7$ is independently selected from hydrogen, alkyl, aryl, alkylaryl and aralkyl. Wherein any $R^1$ to $R^7$ is an alkyl it may contain —O—, —S—, —SO—, —SO$_2$—, —COO—, —OCO—, —CON—moieties. Preferably $R^1$, $R^2$, and $R^7$ each contain from 1 to 36 carbon atoms wherein $R^1$, $R^2$ and $R^7$ is each independently selected from an alkyl, aryl, alkylaryl, or aralkyl. For example, any $R^1$ to $R^7$ may be an alkyl of 1 to 18 carbon atoms which may be terminated by a group —OR', —NR'$_2$, —SR', —COOR' or —CONR'$_2$ or interrupted by arylene of 6 to 10 carbon atoms, —O—, —S—, —SO—, —SO$_2$—, —COO—, —OCO—, —CONR'—, —NR'CO— or —NR'— where each R' is independently hydrogen, alkyl of 1 to 18 carbon atoms or alkenyl of 3 to 6 carbon atoms. $R^1$ to $R^7$ and R' may be selected from independently cycloalkyl of 5 to 12 carbon atoms, phenylalkyl of 7 to 15 carbon atoms, said phenylalkyl substituted on the phenyl ring by alkyl of 1 to 18 carbon atoms or by α-cumyl; aryl of 6 to 14 carbon atoms or said aryl substituted by one or two alkyl of 1 to 24 carbon atoms. Preferably the isoxazolidine is each independently selected from the formula

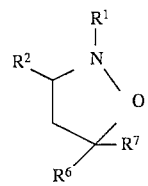

wherein each $R^2$, $R^2$, $R^6$ and $R^7$ is selected from alkyls, aryls, alkylaryls and aralkyls. Most preferably the isoxazolidine is 2,3,5-triphenylisoxazolidine. Another suitable isoxazolidine is 2,3,5,5-tetraphenyl isoxazolidine. Preferably the isoxazolidine is present in the composition at a level of from 0.005 to 2.0 percent by weight based on the total weight of the composition, more preferably from 0.01 to 1.0 percent by weight thereof.

Additional additives such as hindered phenols, hindered amine light stabilizers and phosphites and combinations thereof may also be used in the present compositions.

The resulting stabilized thermoplastic polymer compositions optionally also contain various conventional additives, such as the following:

1. Antioxidants 1.1 Alkylated monophenols, for example: 2,6-di-tert-butyl-4-methylphenol, 2-tert-butyl-4,6dimethylphenol, 2,6-di-tert-butyl-4-ethylphenol, 2,6-di-tert-butyl- 4-n-butylphenol, 2,6-di-tert-butyl-4isobutylphenol, 2,6-dicyclopentyl-4-methylphenol, 2-(alpha-methylcyclohexyl)- 4,6-dimethylphenol, 2,6-di-octadecyl-4-methylphenol, 2,4,6,-tricyclohexylphenol, 2,6-di-tert-butyl-4-methoxymethylphenol.

1.2 Alkylated hydroquinones, for example, 2,6-di-tert-butyl- 4-methoxyphenol, 2,5-di-tert-butyl-hydroquinone, 2,5-di-tert-amyl-hydroquinone, 2,6-diphenyl-4-octadecyloxyphenol.

1.3 Hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), 4,4'-thio-bis-(6-tert-butyl-2-methylphenol).

1.4 Alkylidene-bisphenols, for example, 2,2'-methylene-bis-( 6-tert-butyl-4-methylphenol), 2,2'-methylene-bis-(6-tert-butyl-4-ethylphenol), 2,2'-methylene-bis-( 4-methyl-6-(alphamethylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4methylphenol), 2,2'-methylene-bis-(6-(alpha-methylbenzyl)- 4-nonylphenol), 2,2'-methylene-bis-(6-(alpha,alpha-dimethylbenzyl)-4-nonyl-phenol), 2,2'-methylene-bis-( 4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-( 5-tert-butyl-4-hydroxy-2-methylphenol)butane, 2,6-di-( 3 -tert-butyl-5 -methyl-2 -hydroxybenzyl)-4 methylphenol, 1,1,3 -tris-(5 -tert-butyl-4-hydroxy-2methylphenyl)butane, 1,1 -bis-(5 -tert-butyl-4 -hydroxy-2-methylphenyl)-3 -dodecyl-mercaptobutane, ethyleneglycol-bis-(3,3,-bis-(3'-tert-butyl-4'-hydroxyphenyl)-butyrate)-di-( 3-tert-butyl-4-hydroxy-5-methylphenyl)-dicyclopentadiene, di-(2-(3'-tertbutyl-2'hydroxy-5'methylbenzyl)-6-tert-butyl-4--methylphenyl)terephthalate, and other phenolics such as mono-acrylate esters of bisphenols such as ethylidiene bis-2,4-di-t-butylphenol monoacrylate ester.

1.5 Benzyl compounds, for example, 1,3,5-tris(3,5-di-tert-butyl-4-hydroxybenzyl)-2,4 , 6trimethylbenzene, bis-(3, 5-di-tert-butyl-4-hydroxybenzyl)sulfide, isooctyl 3,5-di-tert-butyl-4-hydroxybenzyl-mercapto-acetate, bis-(4-tert-butyl-3 -hydroxy-2,6-dimethylbenzyl)dithiol-terephthalate. 1,3,5-tris-(3,5-di-tert-butyl-4-hydroxybenzyl)isocyanurate. 1,3,5-tris-(4-tert-butyl-3-hydroxy-2,6-dimethylbenzyl)isocyanurate, dioctadecyl-3,5-di-tert-butyl-4-hydroxybenzylphosphonate, calcium salt of monoethyl 3,5-di-tert-butyl-4-hydroxybenzylphosphonate, 1,3,5-tris-(3,5-dicyclohexyl-4-hydroxybenzyl)isocyanurate.

1.6 Acylaminophenols, for example, 4-hydroxylauric acid anilide, 4-hydroxy-stearic acid anilide, 2,4-bis-octylmercapto-6-(3,5-tert-butyl-4-hydroxyanilino)-s-triazine, octyl-N-(3,5-di-tert-butyl-4-hydroxyphenyl)-carbamate.

1.7 Esters of beta-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethylisocyanurate, thiodiethyleneglycol, dihydroxyethyl oxalic acid diamide.

1.8 Amides of beta-(3,5-di-tert-butyl-4-hydroxyphenol)-propionic acid for example, N,N'-di-(3,5-di-tert-butyl-4-hydroxyphenylpropionyl)-hexamethylen-diamine, N,N'-di-(3, 5-di-tert-butyl-4-hydroxyphenylpropionyl)trimethylenediamine, N,N'-di-(-3, 5-di-tert-butyl-4-hydroxyphenylpropionyl)hydrazine.

2. UV absorbers and light stabilizers 2.1 2-(2'-hydroxyphenyl)-benzotriazoles, for example, the 5'methyl-,3', 5'-di-tert-butyl-,5'-tert-butyl-,5'-(1,1,3,3-tetramethylbutyl)-,5-chloro-3', 5'-di-tert-butyl-,5-chloro-3'-tert-butyl-5'-methyl-3'sec-butyl-5'-tert-butyl-,4'-octoxy,3',5'-di-tert-amyl-,3',5'-bis-(alpha, alpha-dimethylbenzyl)derivatives.

2.2 2-Hydroxy-benzophenones, for example, the 4-hydroxy-4-methoxy-,4-octoxy,4-decyloxy-,4-dodecyloxy-,4-benzyloxy,4,2',4'-trihydroxy- and 2'hydroxy-4,4'-dimethoxy derivative.

2.3 Esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)resorcinol, benzoylresorcinol, 2,4-di-tert-butylphenyl-3,5-di-tert-butyl-4-hydroxybenzoate and hexadecyl-3,5-di-tert-butyl-4-hydroxybenzoate.

2.4 Acrylates, for example, alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or butyl ester, alpha-carbomethoxy-p-methoxy-cinnamic acid methyl ester, N-(beta-carbomethoxy-beta-cyano-vinyl)-2-methyl-indoline.

2.5 Nickel compounds, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6 Sterically hindered amines, for example bis(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetra-carbonic acid, 1,1'(1,2-ethanediyl)-bis-(3,3,5,5-tetramethylpiperazinone). These amines typically called HALS (Hindered Amines Light Stabilizing) include butane tetracarboxylic acid 2,2,6, 6-tetramethyl piperidinol esters. Such amines include hydroxylamines derived from hindered amines, such as di(1-hydroxy-2,2,6,6-tetramethylpiperidin-4-yl)sebacate: 1-hydroxy-2,2,6,6-tetramethyl-4-benzoxypiperidine; 1-hydroxy-2,2,6,6-tetramethyl-4-(3,5-di-tert-butyl-4-hydroxyhydrocinnamoyloxy)piperidine; and N-(1-hydroxy-2,2,6,6-tetramethyl-piperidin-4-yl)-epsilon-caprolactam.

2.7 Oxalic acid diamides, for examples, 4,4'-di-octyloxy-oxanilide, 2,2'-di-octyloxy-5',5'-di-tert-butyloxanilide, 2,2'-di-dodecyloxy-5',5'di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho-and para-methoxy-as well as of o- and p-ethoxy-disubstituted oxanilides.

2.8 Hydroxylphenyl-s-triazines, for example 2,6-bis-(2,4-dimethylphenyl)-4-(2-hydroxy-4-octyloxyphenyl)-s-triazine, 2,6-bis(2,4-dimethyl phenyl)-4-(2,4-dihydroxyphenyl)-s-triazine; 2,4bis-(2,4-dihydroxyphenyl)-6-(4-chlorophenyl)-s-triazine; 2,4-bis (2-hydroxy-4-(2-hydroxyethoxy) phenyl)-6-(4-chlorophenyl)-s-triazine; 2,4-bis(2-hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-triazine; 2,4-bis(2-hydroxy-4-(2-hydroxyethoxy)phenyl)-6-(4-bromophenyl)-s-triazine; 2,4- bis(2-hydroxy-4-(2-acetoryethoxy) phenyl)-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-hydrazine salicyloylamino-1,2,4-triazole, bis-benzyliden-oxalic acid dihydrazide.

4. Phosphite esters (RO) 3P, (RO)2P(O)H wherein R is a hydrocarbon group; for example triaryl phosphites, diaryl phosphites, trialkyl phosphites, dialkylphosphites, phosphites with both alkyl and aryl functionality, aryl phosphites with alkyl groups attached to aryl ring. Simplest respective examples include triphenyl phosphite, diphenyl phosphite, tridecyl phosphite, didecyl phosphite, phenyl didecyl phosphite, diphenyl decyl phosphite, tris (nonylphenyl) phosphite and tris (2,4-di-t-butylphenyl) phosphite, bis-2,4-(di-t-butylphenyl)phosphite.

Phosphite esters from diols or polyols; for example phosphites from pentaerythritol; such as diphenyl, diisoodecy, distearyl, bis-2,4(di-t-butylphenyl), bis(2,6 di-t-butylphenyl), bis (2,4,6 tri-t-butylphenyl), bis(2,4-dicumylphenyl), bis(2,4,6-tricumylphenyl), bis(2-t-butyl, 4 cumylphenyl) pentaerythritol diphosphites. Phosphites from diols such as neopentylglycol or 2-ethyl-2-butyl-1,3-propanediol examples being 2,4-di-t-butylphenyl-cyclic 2-ethyl-2-butyl-1,3-propanediol phosphite ester, 2,4,6 tri-t-butylphenyl cyclic 2-butyl,-2-ethyl-1,3 propanediol phosphite esters.

Phosphites from coupled phenols: examples being 2,2'-ethylidene bis(4,6-di-t-butylphenyl) cyclic phosphite esters with one additional functionality attached. Examples of this functionality may include (O)H,F, di or trialkyl phenyl such as 2,4-di-t-butylphenyl, alkyl such as 2-ethylhexyl. The cyclic phosphites may also be substituted on polyols such as neopentyl glycol, triethanolamine, or pentaerythritol. Cyclic phosphites from biphenols such as 3,3',5,5'-tetra-t-butyl-2,2'-biphenol with additional substituents, as described for the ethylidene bis phenols.

Phosphonites such as tetrakis(2,4-di-t-butylphenyl) 4,4'-biphenylene diphosphonite, tetrakis(2,4-di-t-butyl-3-methylphenyl) 4,4'-biphenylene diphosphonite, ethylidene bis(2,4-di-t-butylphenyl) phenyl phosphonite.

5. Peroxide scavengers, for example, esters of beta-thiodipropionic acid, for example the lauryl, stearyl, myristyl or tridecyl esters, mercaptobenzimidazole or the zinc salt of 2mercaptobenzimidazole, zinc-dibutyldithiocarbamate, dioctadecyldisulfide, pentaerythritoltetrakis-(beta-dodecylmercapto)-propionate.

6. Hydroxylamine, for example, N,N-dibenzylhydrozylamine, N,N-diethylhydroxylamine, N,N-dioctylhydroxylamine, N,N-dilaurylhydroxylamine, N,N-dietradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N-N-dialkylhydroxylamine derived from hydrogenated tallow amine.

7. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, Na ricinoleate and K palmirate, antimony pyrocatecholate or zinc pyrocatecholate, including neutralizers such as hydrotalcites and synthetic hydrotalcites, and Li, Na, Mg, Ca, Al hydroxy carbonates.

10. Nucleating agents, for example, 4-tert butylbenzoic acid, adipic acid, diphenylacetic acid, sodium salt of methylene bis-2,4-dibutylphenyl, cyclic phosphate esters, sorbitol tris-benzaldehyde acetal, and sodium salt of bis(2,4-di-t-butylphenyl) phosphate or Na salt of ethylidene bis(2,4-di-t-butylphenyl)phosphate.

11. Fillers and reinforcing agents, for example, calcium carbonate, silicates, glass fibers, asbestos, talc, kaolin, mica, barium sulfate, metal oxides and hydroxides, carbon black and graphite.

13. Other additives, for example, plasticizers, epoxidized vegetable oils, such as epoxidized soybean oils, lubricants, emulsifiers, pigments, optical brighteners, flameproofing agents, anti-static agents, blowing agents and thiosynergists such as dilaurythiodipropionate or distearylthiodipropionate.

Preferably the compositions contain a neutralizer such as a metal salt of a fatty acid such as calcium stearate.

EXAMPLES 2,3,5-Triphenylisoxazolidine, m.p. 98°–99° C., was prepared reacting N,α-Diphenylnitrone with styrene in 86% yield according to the procedure described by I. Brining, R. Grashey, H. Hauck, R. Huisgen, & H. Seidl. (Org. Synth. Coll. Vol. 5, 1124 (1973))

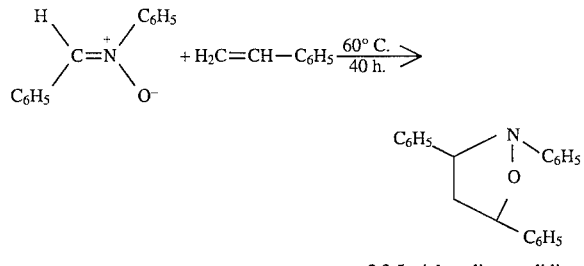

2,3,5-triphenylisoxazolidine 2,3,5,5-Tetraphenylisoxazolidine, m.p. 113°–114° C., was prepared reacting N,α-Diphenylnitrone with 1,1-diphenylethylene in 89.2% yield according to the procedure described by I. Brüning, R. Grashey, H. Hauck, R. Huisgen, & H. Seidl. (Org. Synth. Coll. Vol. 5, 1124 (1973))

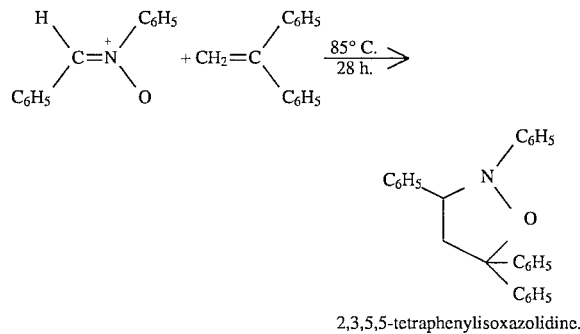

2,3,5,5-tetraphenylisoxazolidine.

2,3,5,5-tetraphenylisoxazolidine.

Process stabilization of polypropylene at 500° F. (260° C.).

The base formulation comprises 100 parts of unstabilized polypropylene (Profax 6501, Montell) with 0.050 parts of calcium stearate. The test stabilizer, if solid, was blended/mixed with the resin using Turbula Blender for 30 minutes.

The test stabilizer, if liquid-, was preblended with Halhiq, a portion of a resin which was subsequently blended with the resin and mixed well using Turbula Blender. The stabilized resin formulation was extruded at 100 rpm from a 1 inch (2.5 h cm) diameter extruder at 500° F. (260° C.) (killion extruder).

After each of the first, third and fifth extrusions, resin pellets were compression molded into 125 mil (3.2 mm) thick plaques at 370° F. (188° C.) and specimen yellowness index (YI) was determined. Low YI values indicate less yellowing. Additionally, the melt flow rate (in grams/10 minutes) was measured (ASTM-D-1238) on the pellets after the first, third and fifth extrusions. The closer the melt flow rate after the fifth extrusion is to the melt flow rate after the first extrusion indicates the superior process stabilization of polypropylene.

TABLE 1

| Example | Ca-St | Stabilizer | Stabilizer | Melt Flow Rate After Extrusion | | |
|---|---|---|---|---|---|---|
| | | | | Run 1 | Run 3 | Run 5 |
| A | 0.05 | — | — | 16.9 | 92.9 | 182 |
| B | — | Stab 1 (0.05) | — | 5.1 | 7.6 | 12.0 |
| C | 0.05 | Stab 1 (0.05) | — | 5.3 | 6.4 | 8.2 |
| 1 | — | Stab 2 0.05 | — | 5.1 | 6.9 | 9.1 |
| 2 | 0.05 | Stab 2 0.05 | — | 5.7 | 7.3 | 9.4 |
| 3 | 0.05 | Stab 2 0.05 | Stab 4 (0.05) | 5.1 | 6.6 | 9.0 |
| 4 | 0.05 | Stab 2 (0.025) | Stab 5 (0.05) | 4.9 | 7.3 | 16.6 |
| 5 | 0.05 | Stab 3 (0.05) | — | 5.3 | 7.5 | 13.2 |

TABLE 2

| Example | Ca-St | Stabilizer | Stabilizer | Yellowness Index After Extrusions | | |
|---|---|---|---|---|---|---|
| | | | | Run 1 | Run 3 | Run 5 |
| A | 0.05 | — | — | 1.93 | 1.97 | 2.38 |
| B | — | Stab 1 (0.05) | — | 35 | 36 | 38 |
| C | 0.05 | Stab 1 (0.05) | — | 15 | 15 | 15 |
| 1 | — | Stab 2 (0.05) | — | 29 | 30 | 31 |
| 2 | 0.05 | Stab 2 (0.05) | — | 7.2 | 6.7 | 8.2 |
| 3 | 0.05 | Stab 2 (0.05) | Stab 4 (0.05) | 7.7 | 7.2 | 7.3 |
| 4 | 0.05 | Stab 2 (0.025) | Stab 5 (0.05) | 2.62 | 3.81 | 4.28 |
| 5 | 0.05 | Stab 3 (0.05) | — | 4.46 | 5.38 | 5.85 |

General comments

Colour: nitrone with/without Ca—St generated more colour compared to isoxazolidines under similar quantities. Addition of phosphites gave improvement in colour.

Stab 1 is N, α-diphenylnitrone.
Stab 2 is 2,3,5-triphenylisoxazolidine.
Stab 3 is 2,3,5,5-tetraphenylisoxazolidine.
Stab 4 is Irgaphos 168 (trademark of CIBA), is tris-(2,4-di-tert-butylphenyl) phosphite.
Stab 5 is Ultranox 626 (trademark of General Electric Company), bis(2,4 di-tert-butylphenyl) pentaerythritol diphosphite.

Especially note the enhanced melt flow and yellowness index of the combination of the isoxazolidine, phosphite and neutralizers. The composition contained polypropylene and calcium stearate and stabilizers as indicated in the percents by weight indicated. The columns headed 1, 3 and 5 are the property values after extrusion passes numbers 1, 3 and 5. Examples A, B and C are comparative examples. Examples 1, 2, 3, 4 and 5 illustrate the present invention.

I claim:

1. A thermoplastic resin composition comprising:
   (a) a thermoplastic resin,
   (b) an isoxazolidine in an amount effective to enhance the melt stability of the thermoplastic resin; wherein said isoxazolidine is selected from isoxazolidine represented by the general formula:

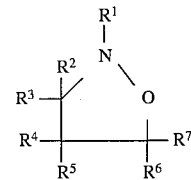

wherein each R1, R2, R3, R4, R5, R6 and R7 is independently selected from hydrogen, alkyl, aryl, alkylaryl and aralkyl.

2. The composition of claim 1 wherein said isoxazolidine is present at a level of between 0.005 and 2.0 percent by weight based on the total weight of the composition.

3. The composition of claim 1 wherein said thermoplastic resin is present at a level of at least 90 percent by weight based on the total weight of the composition.

4. The composition of claim 3 wherein said thermoplastic resin is a polyolefin.

5. The composition of claim 4 wherein said thermoplastic resin is polypropylene.

6. The thermoplastic composition of claim 5 wherein said composition consists essentially of said thermoplastic resin and said isoxazolidine.

7. The thermoplastic composition of claim 1 wherein R3, R4 and R5 of said isoxazolidine are each hydrogen and each R1, R2, R6, and R7 is independently selected from hydrogen, alkyl, aryl, alkylaryl and aralkyl.

8. The composition of claim 7 wherein said isoxazolidine is 2,3,5-triphyenylisoxazolidine.

9. The composition of claim 7 wherein said isoxazolidine is 2,3,5,5-tetraphenyl isoxazolidine.

10. The composition of claim 1 further comprising a metal salt of a fatty acid.

11. The composition of claim 1 further comprising calcium stearate.

12. The composition of claim 1 further comprising a phosphite.

13. The composition of claim 1 further comprising a neutralizer and a phosphite.

14. A thermoplastic resin composition comprising:
   (a) a thermoplastic resin,
   (b) an isoxazolidine in an amount effective to enhance the melt stability of the thermoplastic resin; wherein said isoxazolidine is selected from isoxazolide represented by the general formula:

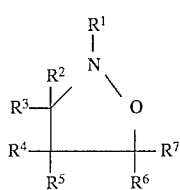

wherein each $R^1$, $R^2$, $R^3$, $R^4$, $R^5$, $R^6$ and $R^7$ is independently selected from hydrogen, alkyl, aryl, cycloalkyl of 5 to 12 carbon atoms, alkylaryl, aralkyl, a straight or branched chain alkyl of 1 to 18 carbon atoms terminated by a group selected from —OR', NR'$_2$, —SR', —COOR' and —CONR'$_2$, and a straight or branched chain alkyl of 1 to 18 carbon atoms interrupted by a group selected from arylene of 6 to 10 carbon atoms, —O—, —S—, —SO—, —SO$_2$—, —COO—, —OCO—, —CONR'—, —NR'CO— and —NR'—; and wherein each R' is independently hydrogen, alkyl of 1 to 18 carbon atoms, cycloalkyl of 5 to 12 carbon atoms, or alkenyl of 3 to 6 carbon atoms.

15. A method for melt stabilizing a thermoplastic resin, said method comprising: admixing a thermoplastic resin and a melt stabilizing amount of an isoxazolidine wherein said isoxazolidine is selected from isoxazolidine represented by the general formula:

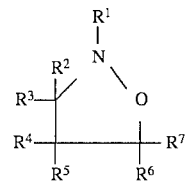

wherein each R1, R2, R3, R4, R5, R6 and R7 is independently selected from hydrogen, alkyl, aryl, alkylaryl and aralkyl.

16. The method of claim 15 wherein said isoxazolidine is 2,3,5-triphenylisoxazolidine.

* * * * *